United States Patent
Bestfleisch et al.

(10) Patent No.: US 10,430,521 B2
(45) Date of Patent: Oct. 1, 2019

(54) TRANSLATABLE TEXTS IN CLOUD APPLICATIONS

(71) Applicant: SAP SE, Walldorf (DE)

(72) Inventors: Ulrich Bestfleisch, Schwetzingen (DE); Oliver Klemenz, Sinsheim (DE); Sebastian Schroetel, Singapore (SG); Sergey Smirnov, Heidelberg (DE); Veit Spaegele, Leimen (DE)

(73) Assignee: SAP SE, Walldorf (DE)

( * ) Notice: Subject to any disclaimer, the term of this patent is extended or adjusted under 35 U.S.C. 154(b) by 13 days.

(21) Appl. No.: 15/256,023

(22) Filed: Sep. 2, 2016

(65) Prior Publication Data
US 2018/0067926 A1    Mar. 8, 2018

(51) Int. Cl.
*G06F 17/28*    (2006.01)
*G06F 9/451*    (2018.01)

(52) U.S. Cl.
CPC ........... *G06F 17/289* (2013.01); *G06F 9/454* (2018.02)

(58) Field of Classification Search
CPC ...... G06F 17/289; G06F 17/28; G06F 9/4448; G06F 17/2247; G06F 17/2836
See application file for complete search history.

(56) References Cited

U.S. PATENT DOCUMENTS

| | | | |
|---|---|---|---|
| 6,092,036 A | 7/2000 | Hamann et al. | |
| 8,255,888 B2 | 8/2012 | Jesse et al. | |
| 9,026,994 B2 | 5/2015 | Yang et al. | |
| 9,047,104 B2 | 6/2015 | Hagelund | |
| 9,292,271 B2 | 3/2016 | Ross | |
| 9,767,096 B2 * | 9/2017 | Goldberger | G06F 17/289 |
| 2002/0198971 A1 * | 12/2002 | Resnick | G05B 19/0421 709/220 |
| 2003/0236576 A1 * | 12/2003 | Resnick | G05B 15/02 700/9 |
| 2006/0047499 A1 * | 3/2006 | Chen | G06F 9/454 704/8 |
| 2009/0287473 A1 | 11/2009 | Bull et al. | |
| 2013/0253901 A1 * | 9/2013 | Krack | G06F 17/289 704/2 |
| 2014/0280484 A1 | 9/2014 | Klemenz et al. | |
| 2014/0282400 A1 * | 9/2014 | Moorthi | G06F 8/71 717/122 |
| 2015/0154181 A1 * | 6/2015 | Dmytryshyn | G06F 9/4448 704/2 |
| 2015/0178264 A1 * | 6/2015 | Liu | G06F 17/273 715/237 |

(Continued)

FOREIGN PATENT DOCUMENTS

EP    1750208 A1    2/2007

*Primary Examiner* — Richemond Dorvil
*Assistant Examiner* — Mark Villena
(74) *Attorney, Agent, or Firm* — Mintz Levin Cohn Ferris Glovsky and Popeo, P.C.

(57) ABSTRACT

A method for internationalization of a computer application being designed and developed as cloud application in a platform-as-a-service (PaaS) environment includes disposing a translatable texts table in a data layer of the computer application as a common source of translatable texts for all layers of the computer application. The method further includes disposing a text string translation service in a logic layer of the computer application. to expose the translatable texts table disposed in the data layer to a presentation layer of the computer application.

19 Claims, 6 Drawing Sheets

(56) References Cited

U.S. PATENT DOCUMENTS

| | | | |
|---|---|---|---|
| 2015/0286609 A1* | 10/2015 | Hahn | G06F 15/167 709/212 |
| 2015/0347396 A1* | 12/2015 | Goldberger | G06F 17/289 704/3 |
| 2016/0026729 A1* | 1/2016 | Gil | H04L 63/1416 726/23 |
| 2016/0277511 A1* | 9/2016 | Fang | G06Q 20/145 |
| 2016/0283204 A1* | 9/2016 | Zaiwei | G06F 8/38 |
| 2016/0306794 A1* | 10/2016 | Huang | G06F 17/2818 |

* cited by examiner

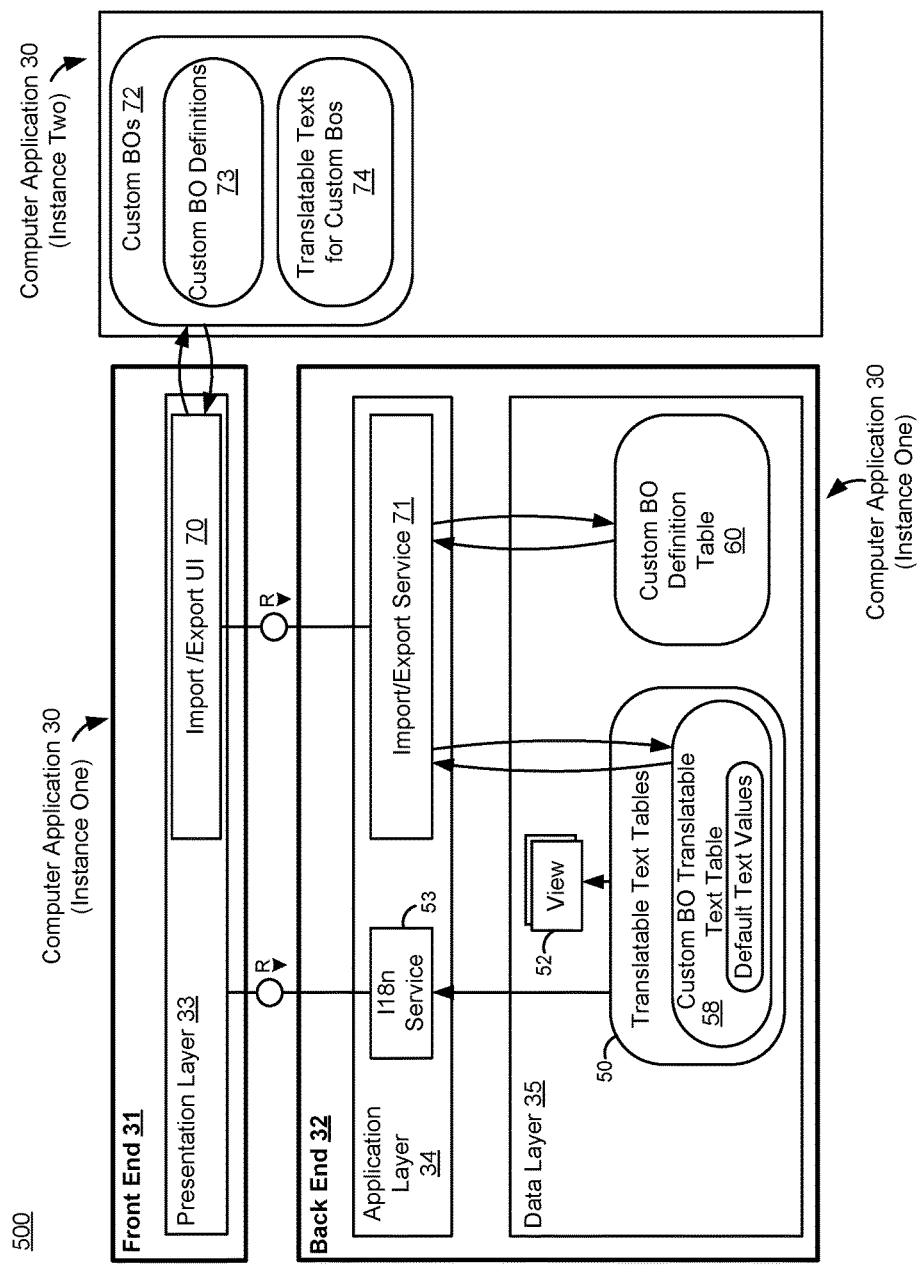

600

```
┌─────────────────────────────────────────────────────────────────┐
│ Disposing a translatable texts table in the data layer of the   │
│ computer application                                             │
│                              601                                 │
└─────────────────────────────────────────────────────────────────┘
                                 ↓
┌─────────────────────────────────────────────────────────────────┐
│ Providing a text string translation service in the logic layer  │
│ of the computer application                                      │
│                              602                                 │
└─────────────────────────────────────────────────────────────────┘
                                 ↓
┌─────────────────────────────────────────────────────────────────┐
│ Providing a translatable text copy mechanism to copy translatable│
│ texts from a text file associated with the computer application │
│ to a default text values portion of the translatable texts table│
│ disposed in the data layer of the computer application          │
│                              603                                 │
└─────────────────────────────────────────────────────────────────┘
                                 ↓
┌─────────────────────────────────────────────────────────────────┐
│ Providing a text customization user interface (UI) in the       │
│ presentation layer of the computer application                   │
│                              604                                 │
└─────────────────────────────────────────────────────────────────┘
                                 ↓
┌─────────────────────────────────────────────────────────────────┐
│ Providing a text customization service in the logic layer of    │
│ the computer application                                         │
│                              605                                 │
└─────────────────────────────────────────────────────────────────┘
                                 ↓
┌─────────────────────────────────────────────────────────────────┐
│ Providing a custom data object manager UI in the presentation   │
│ layer of the computer application                                │
│                              606                                 │
└─────────────────────────────────────────────────────────────────┘
                                 ↓
┌─────────────────────────────────────────────────────────────────┐
│ Providing a custom data object definitions table in the data    │
│ layer of the computer application                                │
│                              607                                 │
└─────────────────────────────────────────────────────────────────┘
                                 ↓
┌─────────────────────────────────────────────────────────────────┐
│ Providing a custom data object manager service in the logic     │
│ layer of the computer application                                │
│                              608                                 │
└─────────────────────────────────────────────────────────────────┘
                                 ↓
┌─────────────────────────────────────────────────────────────────┐
│ Providing an import/export UI disposed in presentation layer of │
│ the computer application                                         │
│                              609                                 │
└─────────────────────────────────────────────────────────────────┘
                                 ↓
┌─────────────────────────────────────────────────────────────────┐
│ Providing an import/export service in the logic layer of the    │
│ computer application                                             │
│                              610                                 │
└─────────────────────────────────────────────────────────────────┘
```

FIG. 6

TRANSLATABLE TEXTS IN CLOUD APPLICATIONS

BACKGROUND

In computing, internationalization and localization are means of adapting computer software to different languages, regional differences and technical requirements of a target market or locale. Internationalization is the process of designing a software application so that it can potentially be adapted to various languages and regions without engineering changes. Localization is the process of adapting internationalized software for a specific region or language by adding locale-specific components and translating text. Localization (which is potentially performed multiple times, for different locales) uses the infrastructure or flexibility provided by internationalization (which is ideally performed only once, or as an integral part of ongoing development).

Modern enterprise applications may be designed and developed as cloud applications in a platform-as-a-service (PaaS) environment. In a traditional internationalization solution for a cloud application, "default" translatable texts are stored in text files that can be used to integrate the default translatable texts into the cloud application under development. A data object is a self-contained entity that includes both data and procedures to manipulate the data. The default translatable texts may, for example, include text (e.g., currency="Dollars", or currency="Euros") that is visually displayed when data objects (e.g., business objects, tables, reports, views, UI elements, etc.) of the cloud application are displayed, for example, locally on a user interface (UI). A translation specialist may enhance the default translatable texts, for example, by correcting them and adding translations into new languages. The default translatable text files may be included in the "internationalized" cloud application as delivered to a customer who has no direct interactions in setting up or creating the default translatable text files.

The foregoing traditional internationalization solution does not address the customer's specific needs for localization or customization of the cloud application. Such customer-specific customization needs may, for example, include a need to modify the default translatable texts to a specific vocabulary used in the customer's organization; a need to create, modify, or delete data objects along with the corresponding translatable texts; a need to change the translatable texts for data objects created by the customer as well as translatable texts for data objects delivered with the application; and a need to transport translatable texts from one instance of the computer application to another instance.

Consideration is now being given to internationalization solutions for cloud application development in the PaaS environments, keeping in view customer-specific needs for localization and customization of the cloud application.

SUMMARY

A method for internationalization of a computer application being designed and developed as cloud application in a platform-as-a-service (PaaS) environment is described herein. The computer application has a back end that includes a data layer and a logic layer, and has a front end that includes a presentation layer for display on a client device. The method includes disposing a translatable texts table in the data layer of the computer application as a common source of translatable texts for all layers of the computer application. The method further includes disposing a text string translation service (e.g., i18n service) in the logic layer of the computer application. The text string translation service exposes the translatable texts table disposed in the data layer to the presentation layer of the computer application.

The details of one or more implementations are set forth in the accompanying drawings and the description below. Further features of the disclosed subject matter, its nature and various advantages will be more apparent from the accompanying drawings the following detailed description, and the claims.

BRIEF DESCRIPTION OF THE DRAWINGS

FIG. 5 is a schematic illustration of a fourth aspect of the example internationalization solution that may be implemented using the system of FIG. 1, in accordance with the principles of the present disclosure.

FIG. 6 is a schematic illustration of an example method for internationalization of a computer application being designed and developed as cloud application in a platform-as-a-service (PaaS) environment, in accordance with the principles of the present disclosure.

Like reference symbols in the various drawings indicate like elements.

DETAILED DESCRIPTION

Systems and methods (collectively "internationalization solutions") for internationalizing a computer application, which may be developed for PaaS environments, are described herein. An internationalization solution described herein provides an application framework or structure which includes structural features designed to facilitate customer-specific localization of the computer application, in accordance with the principles of the present disclosure. The features included in the computer application may include features designed, for example, for supporting customer-specific customization of translatable text, for managing translatable texts for custom data objects, and/or enabling transport of data objects with translatable texts from one instance of the application to another instance of the application.

Figure 1:
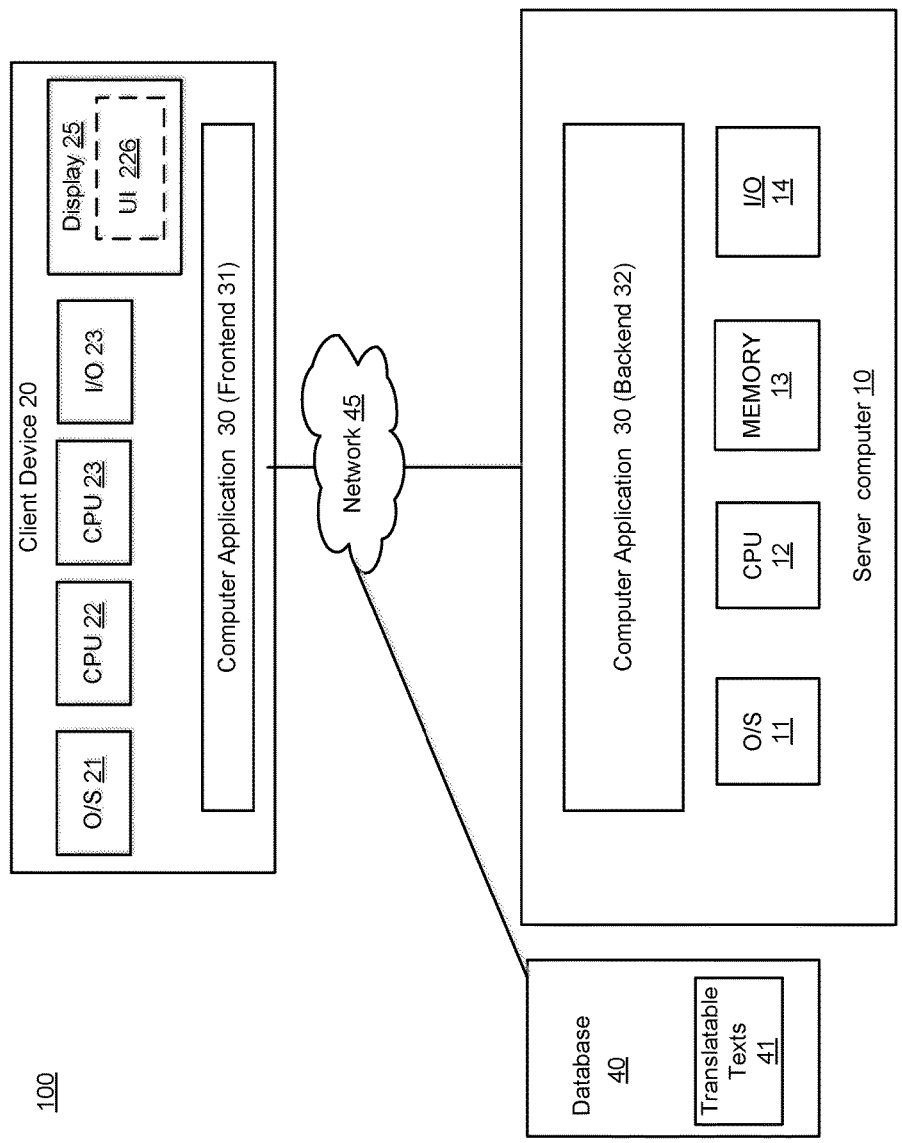
FIG. 1 is a schematic illustration of a system for implementing an example internationalization solution for a computer application, in accordance with the principles of the present disclosure.

FIG. 1 is a schematic illustration of a system 100 for implementing an internationalization solution for a computer application 30, in accordance with the principles of the present disclosure.

System 100 may include one or more server-side computing devices (e.g., computer 10), one or more databases (e.g., database 40) and one or more client devices (e.g., client device 20), which are deployed in a platform-as-a-service (PaaS) configuration over a network 45. For convenience in description herein, system 100 may be interchangeably referred to as "PaaS system 100." System 100 may host computer application 30, for example, in a client-server configuration. FIG. 1 shows, for example, a presentation layer (e.g., front end 31) of computer application 30 hosted on client device 20, and an application back end layer 32 of computer application 30 hosted on computer 20. Application back end layer 32 may, for example, include a logic layer (e.g., application layer 34) and a data layer (e.g., data layer 35) as shown, for example, in FIGS. 2-5. Database 40 may store a translatable texts file 41, which includes default translatable texts that can be used for internationalizing data objects, UIs, etc. of computer application 30. Translatable texts files 41 may be created and delivered (e.g., by application developers) together with computer application 30 when the latter is deployed on PaaS system 100.

Computer 10, which includes an O/S 11, a CPU 12, a memory 13, and I/O 14 may further include or be coupled to a database 40. Client device 20 may any computing device (e.g., a desktop computer, a mainframe computer, a server, a personal computer, a mobile computing device, a laptop, a tablet, or a smart phone) which may be available to a user to connect to computer 10 over network 45. Client device 20, like computer 10, may include components such an O/S 21, a CPU 22, a memory 23, an I/O 24, a display 25 including a UI 26, etc. Client device 20 may have direct access to translatable texts file 41, which includes default translatable texts (e.g., created by application developers) that can be used for internationalizing data objects of computer application 30.

Moreover, although computer 10 is shown in the example of FIG. 1 as a single computer, it may be understood that computer 10 may represent two or more physical machines (and/or a virtual machines) in communication with one another in the PaaS environment. Therefore, it will also be appreciated that any two or more components of system 100 may similarly be executed using some or all of the two or more computing devices in communication with one another. Conversely, it also may be appreciated that various components illustrated as being external to computer 10 may actually be implemented therewith.

PaaS system 100 may be configured to implement an internationalization solution, in accordance with the principles of the present disclosure. An example internationalization solution implemented using PaaS system 100 may have one or more features including, for example, features for supporting customer-specific customization of translatable text, for managing translatable texts for custom data objects, and/or enabling of transport of data objects with translatable texts from one instance of the application to another instance of the application.

FIGS. 2-5 respectively show aspects 200-500 of the example internationalization solution that may be implemented using PaaS system 100, in accordance with the principles of the present disclosure. As shown in FIGS. 2-5, front end 31 of computer application 30 hosted on client device 20 may include a presentation layer 33, and backend layer 32 of computer application 30 hosted on computer 10 may include an application layer 34 and a data layer 35.

Figure 2:
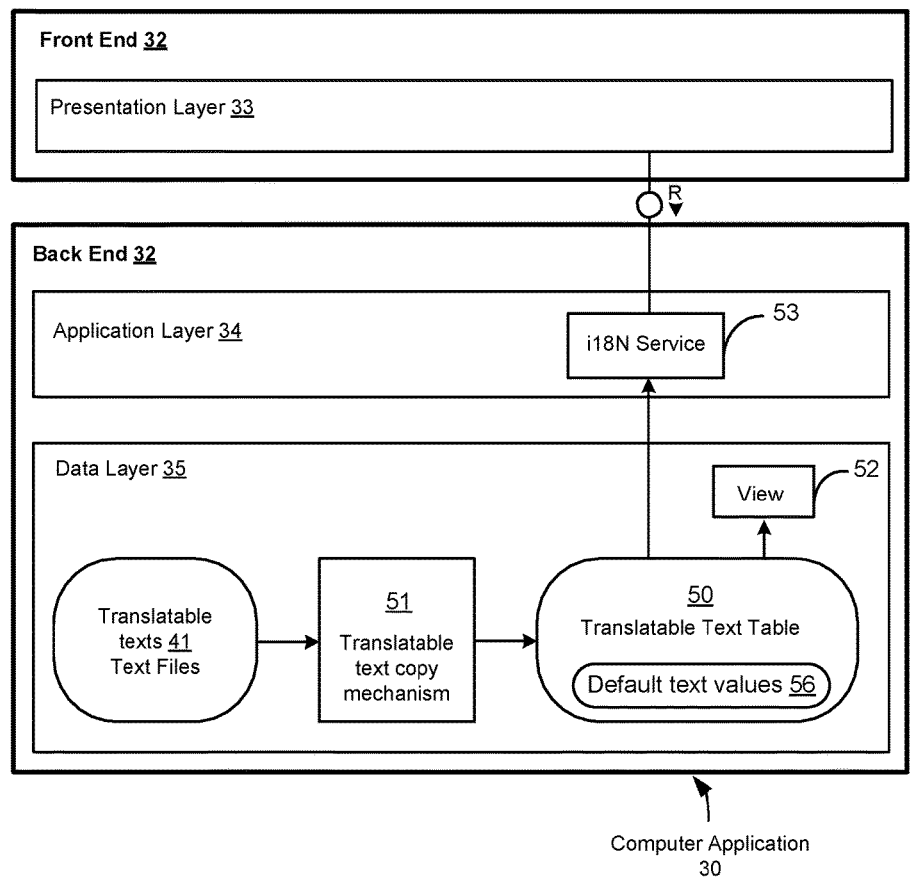
FIG. 2 is a schematic illustration of a first aspect of the example internationalization solution that may be implemented using the system of FIG. 1, in accordance with the principles of the present disclosure.

With reference to FIG. 2, aspect 200 of the example internationalization solution (which may be implemented using PaaS system 100) may relate to providing the logic of the application layer (e.g., application layer 34) and objects of the data layer (e.g., data layer 35) access to the translatable texts contained in translatable texts files 41.

Translatable texts may be stored as key-value pairs in translatable texts files 41. Translatable texts files 41 may, for example, define and store each translatable text as a triple: a language to which all the translatable texts in the file belong; a translatable text value; and a translatable text key, where each key corresponds to exactly one value. An example translatable text may be {language=English; key=greeting; value=Hello!}. Another example translatable text may be {language-Spanish; key-greeting; value-Hola!}.

Presentation layer 33 in front end 31 of computer application may be able to directly access and use the translatable texts content of translatable texts files 41, which may be created and delivered (e.g., by application developers) together with computer application 30.

To enable the logic and objects or artifacts of the application and data layers (e.g., application layer 34 and data layer 35) of computer application 30 access and use the translatable texts content of translatable texts files 41, aspect 200 of the example internationalization solution provides a dedicated database table (e.g., translatable texts table 50) disposed in the data layer (e.g., data layer 35) as a common source of translatable texts for all layers of computer application 30, in accordance with the principles of the present disclosure.

Translatable texts table 50 may store a copy the translatable texts content of translatable texts files 41 and make the translatable texts available to all layers of computer application 30. In example implementations, translatable texts table 50 may have attributes (e.g., Language ID—a language to which the translatable text value belongs, Translatable Text Key—a key used for the translatable text, and Translatable Text Value—a value of the translatable text) that describe the translatable texts content of translatable texts files 41.

In example implementations, PaaS system 100 may include means to copy the content of text files to database files. Translatable texts table 50 may be created using these copying means to copy the content of translatable texts files 41 to translatable texts table 50, for example, when computer application 30 is first deployed (e.g., by application developers) to PaaS system 100. For instances where PaaS system 100 does not include such copying means, data layer 35 of computer application 30 may include a translatable text copy mechanism (e.g., translatable text copy mechanism 51) to copy the content of translatable texts files 41 to translatable texts table 50. In instances when a new version of translatable texts files 41 becomes available, the same copying mechanisms (e.g., standard copying means of PaaS system 100 or translatable text copy mechanism 51 of computer application 30) used during the original deployment of computer application 30 may be used to copy the new versions of the translatable texts to translatable texts table 50. The copies of the translatable texts copied from either new or old versions of translatable texts files 41 received from the application developers may be stored in a default text values portion (e.g., default text values 56) of translatable texts table 50.

Application layer 34 and data layer 35 of computer application 30 may directly access translatable texts table 50 which is placed in data layer 35. For example, database artifacts (e.g., view 52) in data layer 35 may directly access the translatable texts stored in translatable texts table 50. Application logic in application layer 34 may similarly directly access the translatable texts stored in translatable texts table 50.

Aspect 200 of the example internationalization solution may further provide a string translation service (e.g., i18n service 53) in application layer 32, utilizing which presentation layer 33 can access the translatable texts stored in translatable texts table 50, in accordance with the principles of the present disclosure. The string translation service (e.g., i18n service 53) may expose the content of translatable texts table 50 to presentation layer 33 in the format of original text files (e.g., translatable texts files 41)

It is again noted that aspect 200 of the example internationalization solution provides a dedicated database table (e.g., translatable texts table 50) as a common source of translatable texts accessible by all layers of computer application 30. Using translatable texts table 50 as a common source of translatable texts for all layers of computer application 30 may ensure consistency in the usage of translatable texts across all layers of computer application 30.

Figure 3:
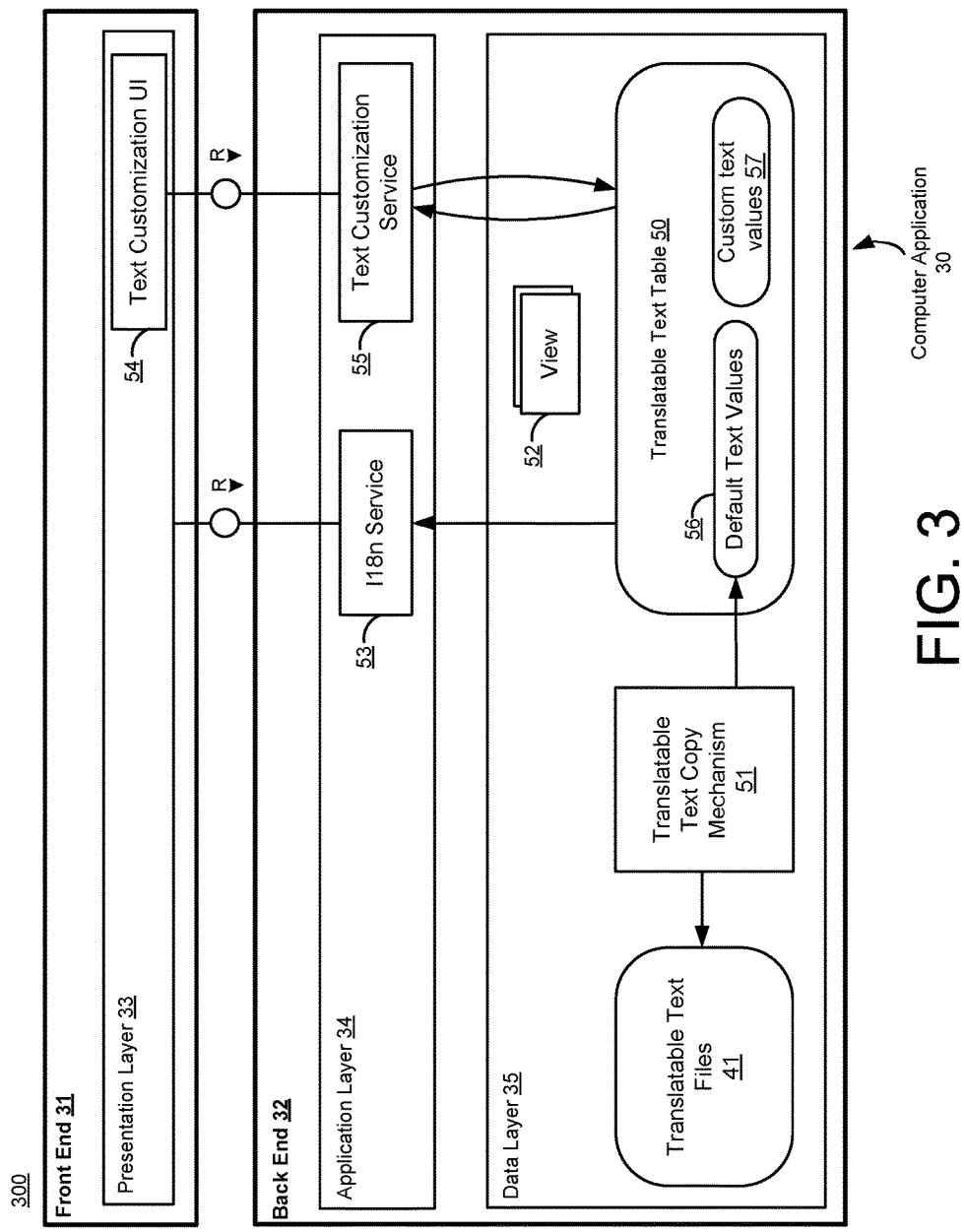
FIG. 3 is a schematic illustration of a second aspect of the example internationalization solution that may be implemented using the system of FIG. 1, in accordance with the principles of the present disclosure.

With reference to FIG. 3, aspect 300 of the example internationalization solution (which may be implemented using PaaS system 100) may relate to providing support for customer-specific customization of the translatable texts in computer application 30.

Customer-specific customization of the translatable texts in computer application 30 may, for example, include processes such as (1) overwriting the existing values of translatable texts (e.g., default text values 56), which are in already defined languages, or (2) introducing a new language in the system and defining new values (in the new language) for translatable texts.

To provide support for customer-specific customization of computer application 30, aspect 300 of the example internationalization solution may provide a graphical user interface (GUI) (e.g., a text customization UI 54) in presentation layer 33 and a text customization service 55 in application layer 34 of computer application 30, in accordance with the principles of the present disclosure.

In an example implementation, text customization service 55 may be configured to display an existing definition of a translatable text from translatable texts table 50 on text customization UI 54. Further, text customization UI 54 may be configured to receive, from a user, a new or custom definition of a translatable text in a format (e.g., as a triple: {language, key, and value}), which is compatible with the structure and format of translatable texts in translatable texts table 50. Text customization UI 54 may send the new or custom definition of the translatable text to text customization service 55 in application layer 34 for processing. Text customization service 55 may persist the new or custom definition of the translatable text in translatable texts table 50; for example, in a separate portion (e.g., custom text values 57) of translatable texts table 50 other than the default text values portion (e.g., default text values 56). It will be understood that translatable texts table 50 may be structured to store both a default translatable text value (e.g., delivered in a text file by the application developer) and a custom translatable text value (e.g., created by a customer).

When accessing translatable texts table 50 (e.g., to retrieve translatable text for customizing application 30), text customization service 55 may be configured to check if, for a requested pair language-key, a custom text value exists in translatable texts table 50 (e.g., in custom text values 57). If a custom text value exists, text customization service 55 may retrieve the custom text value from translatable texts table 50 as the value for the pair language-key. If a custom text value does not exist, text customization service 55 may retrieve the default value (e.g., from default text values 56) from translatable texts table 50 as the value for the pair language-key.

Figure 4:
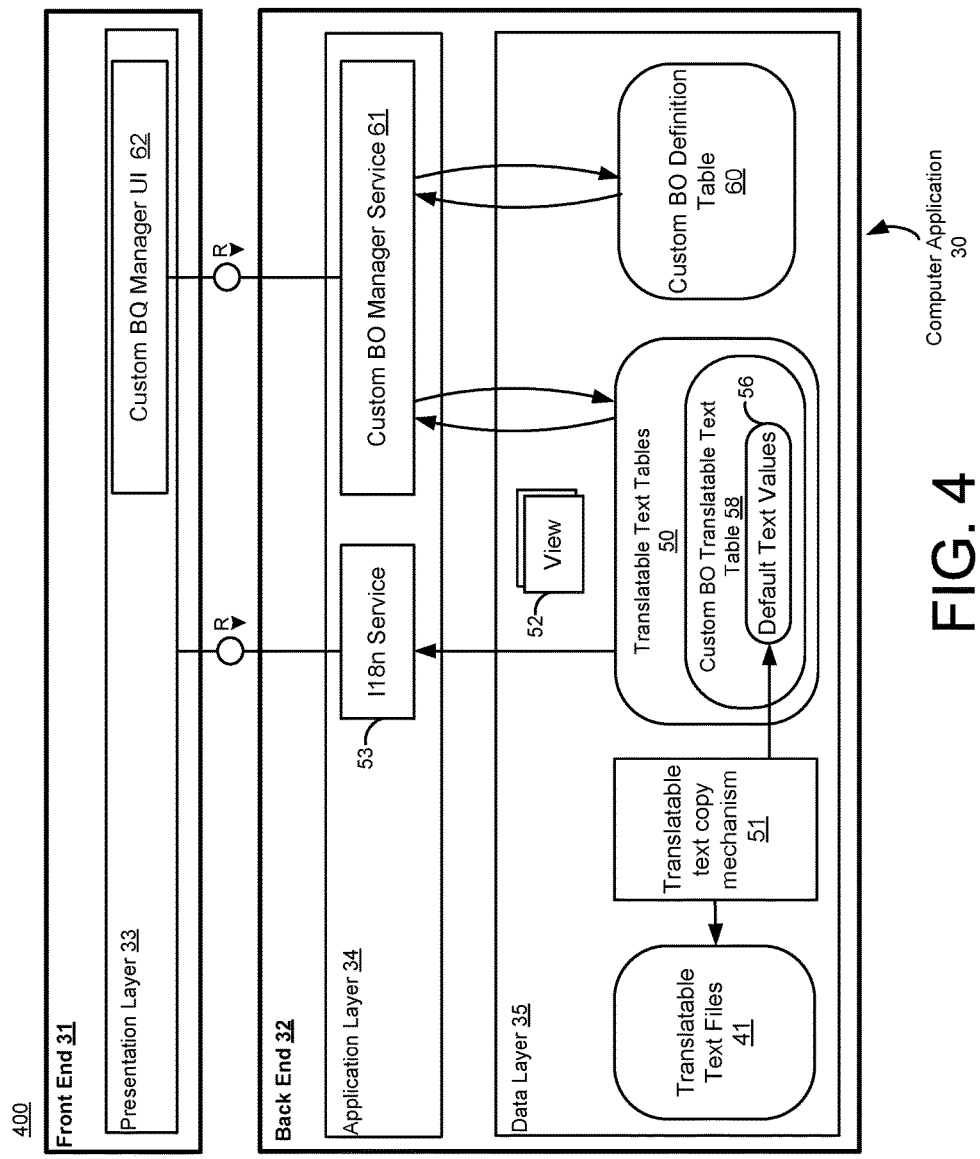
FIG. 4 is a schematic illustration of a third aspect of the example internationalization solution that may be implemented using the system of FIG. 1, in accordance with the principles of the present disclosure.

With reference to FIG. 4, aspect 400 of the example internationalization solution (which may be implemented using PaaS system 100) may relate to managing translatable texts for custom data objects that may be created in computer application 30, in accordance with the principles of the present disclosure.

A custom data object of computer application 30 may be a data object that is either created by an application developer, or created by a customer. An example custom data object may be a business object (BO), which is a special type of data object that stores data relating to a business or aspect of a business. The custom data objects of computer application 30 may have translatable texts.

Customer-specific customization of the data objects of computer application 30 may, for example, include processes such as (1) specifying new values for the translatable texts used in the data objects of computer application 30, or (2) creating new custom data objects, editing custom data objects, and deleting custom data objects, while maintaining the respective translatable texts of computer application 30.

To provide support for customer-specific customization of the custom data objects in computer application 30, aspect 400 of the example internationalization solution may provide a graphical user interface (GUI) (e.g., a custom BO manager UI 62) in presentation layer 33, a custom data object manager service (e.g., custom BO manager service 61) in application layer 34 of computer application 30, and a custom data object definitions table (e.g., custom BO definitions table 60) in data layer 35 of computer application 30, in accordance with the principles of the present disclosure. Interactions between presentation layer components (e.g., custom BO manager UI 62) and data layer components (e.g., translatable texts table 50 and custom BO definitions table 60) may be mediated by custom BO manager service 61 of application layer 34.

Further, aspect 400 of the example internationalization solution may extend the structure of translatable texts table 50 (which includes default text values 56 and custom text values 57) to include a dedicated table (e.g., custom BO translatable texts table 58) to store translatable texts for the custom data objects of computer application 30.

In an example implementation, custom BO definitions table 60 may be configured to store definitions of the custom data objects that are, for example, present in computer application 30. Custom BO manager service 61 may be configured to send an existing definition of a custom data object from custom BO definitions table 60 to custom BO manager UI 62 for display. Conversely, custom BO manager service 61 may be further configured to receive a new or updated definition of a custom data object (including, for example, a notice of a deletion of a custom data object) from custom BO manager UI 62.

Custom BO manager UI 62 may be configured to enable a user to create, update, or delete a custom data object of computer application 30. Custom BO manager service 61 may be configured to update custom BO definitions table 60 according to the changes made on custom BO manager UI 62 to the custom data object definitions.

In an example implementation, custom BO manager service 61 (like text customization service 55) may be further configured to display an existing definition of a translatable text (which is associated with a custom data object) retrieved from translatable texts table 50 on custom BO manager UI 62. Further, custom BO manager UI 62 (like text customization UI 54) may be configured to enable a user to modify or update default translatable text values associated with a custom data object (which may be previously included in computer application 30), and create a new definition of a translatable text, for example, for a newly created custom data object. Custom BO manager service 61

(like text customization service 55) may be configured to receive the new, updated, or modified definitions of the translatable texts associated with the custom data objects from custom BO manager UI 62 for processing, and persist these definitions of the translatable texts associated with the custom data objects in translatable texts table 50.

In example implementations, translatable texts table 50 (which stores default and custom values for translatable texts as triples e.g., {language, key, and value}) may be further structured to store the translatable texts associated with custom data objects in a dedicated table (e.g., custom BO translatable texts table 58). Custom BO translatable texts table 58 may be structured to include information identifying the custom data object to which a translatable text belongs and information on the antecedents of the custom data object along with the translatable text value. For example, custom BO translatable texts table 58 may include records having the following structure:

{Custom BO ID—an identification of the custom data object associated with the text value;

Origin—a descriptor of the origin of the custom data object, e.g., application developer or the customer;

Default Text Value—a default text value as delivered, e.g., by the application developer in text files 41; and Custom Text Value—a text value specified by the customer}.

Customer-specific customization of computer application 30 may also include importing and exporting custom data objects between one instance of computer application 30 and a second instance of computer application 30. The two instances (or versions) of computer application 30 may, for example, be used by different entities in an organization. A customer wanting uniformity in use of computer application 30 across the organization may, for example, import and export custom data objects between the two instances of computer application 30 toward ensuring that the two instances are equivalent.

With reference to FIG. 5, aspect 500 of the example internationalization solution (which may be implemented using PaaS system 100) may relate to importing and exporting custom data objects and transporting the associated translatable texts along with the custom data objects, in accordance with the principles of the present disclosure. FIG. 5 schematically shows two instances (e.g., instance one and instance two) of computer application 30 between which custom data objects can be exported or imported. Instance one and instance two of computer application 30 may be hosted on the same PaaS platform (e.g., system 100) or on similar platforms in communication with each other.

To provide support for importing and exporting custom data objects between the two instances of computer application 30, aspect 500 of the example internationalization solution may provide a graphical user interface (GUI) (e.g., a import/export UI 70) in presentation layer 33 and a service (e.g., import export service 71) in application layer 34 of computer application 30 to manage transfer of custom data objects (e.g., custom BOs 72) between instance one and instance two of computer application 30.

Import/export UI 70 may be configured to enable a user to initiate import or export of a custom data object between the two instances. Importing or exporting a custom data object between the two instances of computer application 30 may involve transferring the custom data object and transferring data (e.g., custom data object definition and corresponding translatable texts data) related to the custom data object between the two instances over system connections.

For an export operation, the customer may, for example, identify (on import/export UI 70) a custom data object (e.g., custom BO 72) for export from instance one to instance two of computer application 30. Import/export UI 70 may trigger import/export service 71 to retrieve data (e.g., custom BO definition 73 and/or corresponding translatable texts 74) related to the identified custom data object from data layer 35 of instance one for export to instance two. Import/export service 72 may be configured to retrieve the data (e.g., custom data object definition and corresponding translatable texts data) related to the identified custom data object (e.g., custom BO 72) from data layer 35 (e.g., from custom BO definitions table 60 and/or custom BO translatable texts table 58) of instance one.

It will be understood that if custom BO 72 is a custom data object that originates in computer application 30 from the application developers (i.e. is not custom created by the customer), the same custom data object definition (and default text values) for custom BO 72 will exist in both instance one and instance two of computer application 30. In such a scenario where the origin of custom 73 is the application developers, it may not be necessary to include the custom data object definition (and default text values) for custom BO 72 in the data exported from instance one to instance two of computer application 30 to fully replicate custom BO 72 in instance two of computer application 30. Only export of translatable texts (e.g., custom text values 57) may be sufficient to fully replicate custom BO 72 in instance two of computer application 30.

Conversely, in a scenario where custom BO 72 is a custom data object custom created in instance one of computer application 30 by the customer, the custom data object definition and all translatable text values for custom BO 72 may be needed to fully replicate custom BO 72 in instance two of computer application 30.

In an example implementation, import/export service 71 may be configured to distinguish between the two foregoing scenarios, for example, by determining the origin (e.g., application developer or the customer) from the record (e.g., Custom BO ID; Origin; Default Text Value; and Custom Text Value}) for custom BO 72 in custom BO translatable texts table 58. Import/export service 72 may be configured to retrieve and export only the data sufficient to fully replicate custom BO 72 in instance two of computer application 30 in each scenario. As discussed in the foregoing, in the scenario where the custom BO 72 origin is the application developers, import/export service 71 may retrieve and export only the custom translatable texts of custom BO 72.

For an import operation, the customer may, for example, identify (on import/export UI 70) a custom data object (e.g., custom BO 72) being imported from instance two to instance one of computer application 30. When custom BO 72 and related data (e.g., custom BO definition 73 and corresponding translatable texts 74, or corresponding translatable texts 74) are received at instance one from instance two of computer application 30, import/export service 71 may be configured to incorporate the received custom BO 72, if not preexisting, in instance one of computer application 30. Import/export service 71 may further update custom BO table 60 and translatable texts table 50 to include the received related data (e.g., custom BO definition 73 and corresponding translatable texts 74). If custom BO 72 is preexisting in instance one of computer application 30, import/export service 71 may further update translatable texts table 50 to include the received related data (e.g., corresponding translatable texts 74).

FIG. 6 is an schematic illustration of an example method 600 for internationalization of a computer application being designed and developed as cloud application in a platform-as-a-service (PaaS) environment, in accordance with the principles of the present disclosure.

The computer application may have a back end that includes a data layer and an application or logic layer, and a front end that includes a presentation layer for display on a client device.

With reference to FIG. 6, method 600 may include disposing a translatable texts table in the data layer of the computer application (601) and providing a text string translation service in the logic layer of the computer application (602). The translatable texts table may contain translatable texts of the computer application. The translatable texts table may serve as a common source of the translatable texts for all layers of the computer application. The text string translation service (e.g., i18n service) disposed in the logic layer may expose the translatable texts table disposed in the data layer to the presentation layer of the computer application.

Method 600 may further include providing a translatable text copy mechanism to copy translatable texts from a text file associated with the computer application to a default text values portion of the translatable texts table disposed in the data layer of the computer application (603).

In an example implementation, method 600 may further include providing a text customization user interface (UI) in the presentation layer of the computer application (604) and providing a text customization service in the logic layer of the computer application (605). The text customization UI may be configured to receive, from a user, a custom definition of a translatable text in a format that is compatible with the structure and format of translatable texts in the translatable texts table. The text customization service may be configured to receive the custom definition of the translatable text from the text customization UI and persist the custom definition of the translatable text in a custom text values portion of the translatable texts table. Further, the text customization service in the logic layer may be configured to check whether, for a requested pair language-key, a custom text value exists in the translatable texts table and, if the custom text value exists, to retrieve the custom text value from translatable texts table as a value for the pair language-key.

In another example implementation, method 600 may further include providing a custom data object manager UI in the presentation layer of the computer application (606), providing a custom data object definitions table in the data layer of the computer application (607), and providing a custom data object manager service disposed in the logic layer of the computer application to mediate interactions between the custom data object manager UI, the custom data object definitions table and the translatable texts table (608). The custom data object manager service may be configured to receive new or updated definitions of custom data objects (and related translatable texts data) from the custom data object manager UI and configured to update the custom data object definitions table and the translatable texts table in response to changes made by a user on the custom data object manager UI.

In yet another example implementation, method 600 may further include providing an import/export UI disposed in presentation layer of the computer application (609), and providing an import/export service disposed in the logic layer of the computer application (610). The import/export service may be configured to manage transfer of a custom data object and related translatable texts data between one instance of the computer application and a second instance of the computer application initiated from the import/export UI.

Method 600 may be performed by, or implemented using, for example, system 100 (FIG. 1).

The various systems and techniques described herein may be implemented in digital electronic circuitry, or in computer hardware, firmware, or in combinations of them. The various techniques may implemented as a computer program product, i.e., a computer program tangibly embodied in a machine readable storage device, for execution by, or to control the operation of, data processing apparatus, e.g., a programmable processor, a computer, or multiple computers.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magnetooptical disks, or optical disks. Information carriers suitable for embodying computer program instructions and data include all forms of nonvolatile memory, including by way of example semiconductor memory devices, e.g., EPROM, EEPROM, and flash memory devices; magnetic disks, e.g., internal hard disks or removable disks; magnetooptical disks; and CDROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a backend component, e.g., as a data server, or that includes a middleware component, e.g., an application server, or that includes a frontend component, e.g., a client computer having a graphical user interface or a Web browser through which a user can interact with an implementation, or any combination of such backend, middleware, or frontend components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A system comprising:
   a memory;
   a semiconductor-based processor, the memory and the processor hosting a computer application in a platform-as-a-service configuration over a network, the computer application having a back end that includes a data layer and a logic layer, and having a front end that includes a presentation layer for display on a client device;
   a translatable texts table disposed in the data layer, the translatable texts table containing translatable texts of the computer application, each record in the translatable texts table including a language attribute, a key attribute, and a value attribute, wherein database artifacts in the data layer and application logic in the logic layer have direct access to the translatable texts table disposed in the data layer;
   a custom data object definitions table disposed in the data layer, the custom data object definitions table including definitions of one or more custom data objects of the computer application, wherein the translatable texts table further includes a custom text table configured to store translatable texts associated with the custom data objects of the computer application, each record in the custom text table including a custom data object identifier attribute, an origin attribute, a default text value attribute, and a custom text value attribute;
   a text string translation service disposed in the logic layer, the text string translation service exposing the translatable texts table disposed in the data layer to the presentation layer of the computer application; and
   an import/export service disposed in the logic layer, the import/export service configured to export a first custom data object that was custom-created in a first instance of the computer application to a second instance of the computer application by transferring the custom data object definitions of the first custom data object and all respective translatable texts associated with the first custom data object, each respective translatable text comprising a record in the translatable texts table, the import/export service further configured to replicate the first custom data object in the second instance of the computer application.

2. The system of claim 1 further comprising a translatable text copy mechanism to copy translatable texts from a text file associated with the computer application to a default text values portion of the translatable texts table disposed in the data layer of the computer application.

3. The system of claim 1, wherein a translatable text record in the translatable texts table has a language attribute, a key attribute, and a value attribute, wherein the language attribute identifies a language to which the translatable text belongs, the key attribute is a key used for the translatable text in the computer application; and the value attribute is a value of the translatable text for the key.

4. The system of claim 1, wherein the text string translation service is an i18n service, which exposes the translatable text table to the presentation layer.

5. The system of claim 1 further comprising:
   a text customization user interface (UI) in the presentation layer; and
   a text customization service in the logic layer of the computer application, wherein the text customization service is configured to provide an existing definition of a translatable text from the translatable texts table to the text customization UI.

6. The system of claim 5, wherein the text customization UI is configured to receive, from a user, a custom definition of a translatable text in a format that is compatible with the structure and format of translatable texts in the translatable texts table.

7. The system of claim 6, wherein the text customization service in the logic layer is configured to receive the custom definition of the translatable text from the text customization UI and persist the custom definition of the translatable text in a custom text values portion of the translatable texts table.

8. The system of claim 7, wherein the text customization service in the logic layer is configured to check whether, for a requested pair language-key, a custom text value exists in the translatable texts table and, if the custom text value exists, to retrieve the custom text value from translatable texts table as a value for the pair language-key.

9. The system of claim 1 further comprising:
   a custom data object manager UI disposed in the presentation layer;
   a custom data object definitions table in the data layer; and
   a custom data object manager service disposed in the logic layer to mediate interactions between the custom data object manager UI, the custom data object definitions table and the translatable texts table.

10. The system of claim 9, wherein the custom data object manager service is configured to send an existing definition of a custom data object from the custom data objects definitions table to the custom data objects manager UI for display, and configured to receive new or updated definitions of custom data objects from the custom data object manager UI.

11. The system of claim 9, wherein the custom data object manager UI is configured to enable a user to create, update, or delete a custom data object of computer application, and wherein the custom data object manager service is configured to update custom data object definitions table in response to changes made by a user on the custom data object manager UI.

12. The system of claim 9, wherein the data objects manager UI is configured to enable a user to create, modify or update translatable text values associated with a custom data object, and wherein the custom data objects manager service is configured to receive the created, updated, or modified translatable text values associated with the custom data object from the custom data object manager service and persist these translatable text values associated with the custom data object in the translatable texts table.

13. The system of claim 1 further comprising:
   an import/export UI disposed in presentation layer, the import/export service configured to manage transfer of a custom data object and related data between one instance of the computer application and a second instance of the computer application initiated from the import/export UI.

14. A method for internationalization of a computer application being designed and developed as a cloud application in a platform-as-a-service environment, the computer application having a back end that includes a data layer and a logic layer, and having a front end that includes a presentation layer for display on a client device, the method comprising:
- disposing a translatable texts table in the data layer, the translatable texts table containing translatable texts of the computer application, each record of the translatable texts table including a language attribute, a key attribute, and a value attribute, the translatable texts table being a common source of the translatable texts accessible by all layers of the computer application;
- disposing a custom data object definitions table in the data layer, the custom data object definitions table including definitions of one or more custom data objects of the computer application, wherein the translatable texts table further includes a custom text table configured to store translatable texts associated with the custom data objects of the computer application, each record in the custom text table including a custom data object identifier attribute, an origin attribute, a default text value attribute, and a custom text value attribute;
- disposing a text string translation service in the logic layer, the text string translation service exposing the translatable texts table disposed in the data layer to the presentation layer of the computer application; and
- disposing an import/export service in the logic layer, the import/export service configured to export a first custom data object that was custom-created in a first instance of the computer application to a second instance of the computer application by transferring the custom data object definitions of the first custom data object and all respective translatable texts associated with the first custom data object, each respective translatable text comprising a record in the translatable texts table, the import/export service further configured to replicate the first custom data object in the second instance of the computer application.

15. The method of claim 14 further comprising:
providing a translatable text copy mechanism to copy translatable texts from a text file associated with the computer application to a default text values portion of the translatable texts table disposed in the data layer of the computer application.

16. The method of claim 14 further comprising:
providing a text customization user interface (UI) in the presentation layer, wherein the text customization UI is configured to receive, from a user, a custom definition of a translatable text in a format that is compatible with the structure and format of translatable texts in the translatable texts table; and
a text customization service in the logic layer of the computer application, wherein the text customization service is configured to receive the custom definition of the translatable text from the text customization UI and persist the custom definition of the translatable text in a custom text values portion of the translatable texts table.

17. The method of claim 16, wherein the text customization service in the logic layer is configured to check whether, for a requested pair language-key, a custom text value exists in the translatable texts table and, if the custom text value exists, to retrieve the custom text value from translatable texts table as a value for the pair language-key.

18. The method of claim 14 further comprising:
providing a custom data object manager UI in the presentation layer;
providing a custom data object definitions table in the data layer; and
providing a custom data object manager service disposed in the logic layer to mediate interactions between the custom data object manager UI, the custom data object definitions table and the translatable texts table, wherein the custom data object manager service is configured to receive new or updated definitions of custom data objects from the custom data object manager UI and configured to update the custom data object definitions table in response to changes made by a user on the custom data object manager UI.

19. The method of claim 14 further comprising:
providing an import/export UI disposed in presentation layer, the import/export service configured to manage transfer of a custom data object and related data between one instance of the computer application and a second instance of the computer application initiated from the import/export UI.

* * * * *